US009659069B2

(12) United States Patent
Runov et al.

(10) Patent No.: US 9,659,069 B2
(45) Date of Patent: May 23, 2017

(54) HIGHLIGHTING ITEMS FOR SEARCH RESULTS

(71) Applicant: Apple Inc., Cupertino, CA (US)

(72) Inventors: Maxym I. Runov, San Jose, CA (US); Bas Ording, San Francisco, CA (US); Steve Ko, San Francisco, CA (US); Gregory N. Christie, San Jose, CA (US); Kevin Tiene, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 350 days.

(21) Appl. No.: 14/212,853

(22) Filed: Mar. 14, 2014

(65) Prior Publication Data

US 2014/0280074 A1 Sep. 18, 2014

Related U.S. Application Data

(63) Continuation of application No. 10/985,630, filed on Nov. 10, 2004, now Pat. No. 8,677,274.

(51) Int. Cl.
  *G06F 3/048* (2013.01)
  *G06F 17/30* (2006.01)
  *G06F 3/0482* (2013.01)

(52) U.S. Cl.
  CPC ...... *G06F 17/30554* (2013.01); *G06F 3/0482* (2013.01); *G06F 17/30067* (2013.01);
  (Continued)

(58) Field of Classification Search
  CPC ......... G06F 17/30864; G06F 17/30554; G06F 17/30522; G06F 17/0482
  (Continued)

(56) References Cited

U.S. PATENT DOCUMENTS

| 5,040,131 A | 8/1991 | Torres |
| 5,485,175 A | 1/1996 | Suzuki |

(Continued)

FOREIGN PATENT DOCUMENTS

| EP | 0677803 A2 | 10/1995 |
| EP | 0747804 A1 | 12/1996 |

(Continued)

OTHER PUBLICATIONS

"U.S. Appl. No. 10/985,630, Response filed Aug. 23, 2013 to Non Final Office Action mailed May 23, 2013", 15 pgs.

(Continued)

*Primary Examiner* — Daeho Song
(74) *Attorney, Agent, or Firm* — Squire Patton Boggs (US) LLP

(57) ABSTRACT

The present invention provides a search capability to allow a user to easily locate a preference control, file, folder, control, or other system resource or data item associated with a search result. In one embodiment, a user enters a search term (or a portion thereof) in a search field associated with one or more resource types that may be searched. The user may be presented with a pop-up menu containing a list of likely matches. The user selects the desired preference control from the pop-up menu, and the corresponding preference pane, or other container, containing the selected data item, control, or other resource is displayed. In one aspect, as the user enters the search term (or portion thereof), certain icons are highlighted. Specifically, those icons that represent containers containing matching data items (such as preference panes having controls that match the search term) are highlighted. Different types of highlighting can be used depending on the degree of certainty as to which container is likely to contain the correct match.

21 Claims, 6 Drawing Sheets

(52) U.S. Cl.
CPC .. *G06F 17/30424* (2013.01); *G06F 17/30991* (2013.01); *G06F 17/30997* (2013.01)

(58) Field of Classification Search
USPC ................................. 715/816, 821, 828, 780
See application file for complete search history.

(56) References Cited

U.S. PATENT DOCUMENTS

| | | | |
|---|---|---|---|
| 5,806,069 | A | 9/1998 | Wakiyama et al. |
| 5,875,446 | A | 2/1999 | Brown et al. |
| 5,982,370 | A | 11/1999 | Kamper |
| 6,012,053 | A | 1/2000 | Pant |
| 6,075,536 | A | 6/2000 | Kunieda et al. |
| 6,112,153 | A | 8/2000 | Schaaf et al. |
| 6,243,093 | B1 | 6/2001 | Czerwinski et al. |
| 6,288,718 | B1 | 9/2001 | Laursen et al. |
| 6,330,576 | B1 | 12/2001 | Mochizuki et al. |
| 6,334,157 | B1 | 12/2001 | Oppermann et al. |
| 6,335,740 | B1 | 1/2002 | Tanaka |
| 6,448,987 | B1 | 9/2002 | Easty et al. |
| 6,453,254 | B1 | 9/2002 | Bullwinkel et al. |
| 6,473,006 | B1 | 10/2002 | Yu |
| 6,654,758 | B1 | 11/2003 | Teague |
| 6,661,425 | B1 | 12/2003 | Hiroaki |
| 6,704,727 | B1 | 3/2004 | Kravets |
| 6,801,230 | B2 | 10/2004 | Driskell |
| 6,839,702 | B1 | 1/2005 | Patel et al. |
| 6,952,675 | B1 | 10/2005 | Tahara et al. |
| 6,952,805 | B1* | 10/2005 | Tafoya ................. G06Q 10/107 709/206 |
| 7,028,306 | B2 | 4/2006 | Boloker et al. |
| 7,120,646 | B2 | 10/2006 | Streepy, Jr. |
| 7,194,411 | B2 | 3/2007 | Slotznick et al. |
| 7,249,369 | B2 | 7/2007 | Knouse et al. |
| 7,281,008 | B1* | 10/2007 | Lawrence ......... G06F 17/30864 |
| 7,313,526 | B2 | 12/2007 | Roth et al. |
| 7,337,411 | B1* | 2/2008 | Racine ................. G06F 3/0483 715/762 |
| 7,340,686 | B2 | 3/2008 | Matthews et al. |
| 7,366,989 | B2 | 4/2008 | Naik et al. |
| 7,448,042 | B1 | 11/2008 | Engber et al. |
| 7,523,187 | B1 | 4/2009 | Lavallee et al. |
| 7,941,762 | B1* | 5/2011 | Tovino ................. H04L 51/046 379/201.01 |
| 7,979,796 | B2 | 7/2011 | Williams et al. |
| 8,024,335 | B2 | 9/2011 | Anthony et al. |
| 8,607,162 | B2 | 12/2013 | Williams et al. |
| 8,677,274 | B2 | 3/2014 | Runov et al. |
| 2001/0030667 | A1 | 10/2001 | Kelts |
| 2002/0002588 | A1 | 1/2002 | Sugimoto |
| 2002/0044152 | A1 | 4/2002 | Abbott, III et al. |
| 2002/0085017 | A1* | 7/2002 | Pisutha-Arnond .... G06F 3/0482 345/660 |
| 2002/0091690 | A1* | 7/2002 | Bailey ............... G06F 17/30398 |
| 2002/0163547 | A1 | 11/2002 | Abramson et al. |
| 2003/0098893 | A1* | 5/2003 | Makinen ........... G06F 17/30991 715/853 |
| 2003/0105748 | A1 | 6/2003 | Ishida et al. |
| 2003/0142140 | A1 | 7/2003 | Brown et al. |
| 2003/0158796 | A1* | 8/2003 | Balent ................ G06Q 30/0633 705/28 |
| 2003/0214538 | A1* | 11/2003 | Farrington ........ G06F 17/30994 715/854 |
| 2003/0236778 | A1 | 12/2003 | Masumoto et al. |
| 2004/0090472 | A1 | 5/2004 | Risch et al. |
| 2004/0133564 | A1 | 7/2004 | Gross et al. |
| 2004/0135815 | A1 | 7/2004 | Browne et al. |
| 2004/0143564 | A1 | 7/2004 | Gross et al. |
| 2004/0143569 | A1 | 7/2004 | Gross et al. |
| 2004/0215660 | A1* | 10/2004 | Ikeda ................. G06F 17/30277 |
| 2005/0066270 | A1 | 3/2005 | Ali et al. |
| 2005/0080769 | A1* | 4/2005 | Gemmell .......... G06F 17/30991 |
| 2005/0216859 | A1* | 9/2005 | Paek ..................... G06F 3/0481 715/810 |
| 2005/0283468 | A1 | 12/2005 | Kamvar et al. |
| 2005/0289109 | A1 | 12/2005 | Arrouye et al. |
| 2006/0048074 | A1* | 3/2006 | Klein ................ G06F 17/30398 715/811 |
| 2006/0100999 | A1* | 5/2006 | Sencaj ............... G01C 21/3611 |
| 2006/0101347 | A1 | 5/2006 | Runov et al. |
| 2006/0294475 | A1 | 12/2006 | Holecek et al. |
| 2007/0033172 | A1 | 2/2007 | Williams et al. |
| 2007/0156648 | A1 | 7/2007 | Bridges et al. |
| 2007/0218445 | A1 | 9/2007 | Uwague-Igharo |
| 2007/0300177 | A1 | 12/2007 | Karas et al. |
| 2008/0163085 | A1 | 7/2008 | Subbu et al. |
| 2011/0258584 | A1 | 10/2011 | Williams et al. |

FOREIGN PATENT DOCUMENTS

| | | |
|---|---|---|
| EP | 1045314 A2 | 10/2000 |
| EP | 1363185 A2 | 11/2003 |
| EP | 1447758 A2 | 8/2004 |
| JP | 10-63684 A | 3/1998 |
| JP | 10-187233 A | 7/1998 |
| JP | 10-333554 A | 12/1998 |
| JP | 11-126145 A | 5/1999 |
| JP | 2000-216871 A | 8/2000 |
| JP | 2001-117689 A | 4/2001 |
| JP | 2003-122746 A | 4/2003 |
| JP | 2004-030122 A | 1/2004 |
| JP | 2004-062567 A | 2/2004 |
| JP | 2004-302981 A | 10/2004 |
| WO | WO-03/052574 A1 | 6/2003 |

OTHER PUBLICATIONS

"U.S. Appl. No. 10/985,630, Advisory Action mailed Oct. 30, 2008", 3 pgs.

"U.S. Appl. No. 10/985,630, Appeal Brief filed Mar. 30, 2009", 32 pgs.

"U.S. Appl. No. 10/985,630, Appeal Decision mailed Aug. 21, 2012", 8 pgs.

"U.S. Appl. No. 10/985,630, Decision on Pre Appeal Brief mailed Jan. 23, 2009", 2 pgs.

"U.S. Appl. No. 10/985,630, Examiner Interview Summary mailed Jul. 8, 2013", 3 pgs.

"U.S. Appl. No. 10/985,630, Examiner Interview Summary mailed Sep. 11, 2012", 2 pgs.

"U.S. Appl. No. 10/985,630, Examiner's Answer to Appeal Brief mailed Sep. 3, 2009", 39 pgs.

"U.S. Appl. No. 10/985,630, Final Office Action mailed Apr. 2, 2008", 34 pgs.

"U.S. Appl. No. 10/985,630, Final Office Action mailed Aug. 26, 2008", 34 pgs.

"U.S. Appl. No. 10/985,630, Non Final Office Action mailed May 23, 2013", 19 pgs.

"U.S. Appl. No. 10/985,630, Non Final Office Action mailed Jul. 25, 2007", 27 pgs.

"U.S. Appl. No. 10/985,630, Notice of Allowance mailed Nov. 8, 2013", 8 pgs.

"U.S. Appl. No. 10/985,630, Notice of Allowance mailed Nov. 15, 2012", 8 pgs.

"U.S. Appl. No. 10/985,630, Notice of Non-Compliant Amendment mailed Apr. 28, 2009", 2 pgs.

"U.S. Appl. No. 10/985,630, Pre Appeal Brief Request filed Dec. 29, 2008", 5 pgs.

"U.S. Appl. No. 10/985,630, Preliminary Amendment filed Nov. 18, 2005", 33 pgs.

"U.S. Appl. No. 10/985,630, Reply Brief filed Nov. 3, 2009", 10 pgs.

"U.S. Appl. No. 10/985,630, Response filed Jun. 16, 2009 to Notice of Non-Compliant Amendment mailed Apr. 28, 2009", 4 pgs.

"U.S. Appl. No. 10/985,630, Response filed Jul. 23, 2008 to Final Office Action mailed Apr. 2, 2008", 2 pgs.

"U.S. Appl. No. 10/985,630, Response filed Aug. 4, 2008 to Final Office Action mailed Apr. 2, 2008", 24 pgs.

(56) References Cited

OTHER PUBLICATIONS

"U.S. Appl. No. 10/985,630, Response filed Aug. 23, 2013 to Non-Final Office Action mailed May 23, 2013", 15 pgs.
"U.S. Appl. No. 10/985,630, Response filed Oct. 19, 2008 to Final Office Action mailed Aug. 26, 2008", 24 pgs.
"U.S. Appl. No. 10/985,630, Response filed Dec. 26, 2007 to Non Final Office Action mailed Jul. 25, 2007", 26 pgs.
"U.S. Appl. No. 11/496,006, Examiner Interview Summary mailed Oct. 1, 2010", 3 pgs.
"U.S. Appl. No. 11/496,006, Examiner Interview Summary mailed Nov. 3, 2010", 3 pgs.
"U.S. Appl. No. 11/496,006, Non Final Office Action mailed Jun. 23, 2010", 43 pgs.
"U.S. Appl. No. 11/496,006, Notice of Allowance mailed Mar. 4, 2011", 25 pgs.
"U.S. Appl. No. 11/496,006, PTO Response to 312 Amendment mailed Apr. 4, 2011", 2 pgs.
"U.S. Appl. No. 11/496,006, Response filed Feb. 4, 2010 to Restriction Requirement mailed Jan. 4, 2010", 17 pgs.
"U.S. Appl. No. 11/496,006, Response filed Mar. 18, 2011 to Notice of Allowance mailed Mar. 4, 2011", 3 pgs.
"U.S. Appl. No. 11/496,006, Response filed Nov. 22, 2010 to Non Final Office Action mailed Jun. 23, 2010", 21 pgs.
"U.S. Appl. No. 11/496,006, Restriction Requirement mailed Jan. 4, 2010", 5 pgs.
"U.S. Appl. No. 13/154,352, Notice of Allowance mailed Aug. 5, 2013", 21 pgs.
"U.S. Appl. No. 13/154,352, Preliminary Amendment filed Jun. 30, 2011", 9 pgs.
"Australian Application Serial No. 2005304334, Examiner's First Report dated Apr. 13, 2010", 3 pgs.
"Australian Application Serial No. 2005304334, Examiner's Second Report mailed Oct. 5, 2011", 3 pgs.
"Australian Application Serial No. 2005304334, Response filed Jan. 12, 2012 to Examiner's Second Report dated Oct. 5, 2011", 19 pgs.
"Canadian Application Serial No. 2,584,823, Office Action mailed May 9, 2012", 21 pgs.
"Canadian Application Serial No. 2,584,823, Response filed Nov. 9, 2012 to Office Action mailed May 9, 2012", 35 pgs.
"Chinese Application Serial No. 200580038476.3, Office Action mailed Jun. 21, 2011", (w/ English Translation), 16 pgs.
"Chinese Application Serial No. 200580038476.3, Office Action mailed Sep. 5, 2008", (w/ English Translation), 16 pgs.
"Chinese Application Serial No. 200580038476.3, Response filed Mar. 20, 2009 to Office Action mailed Sep. 5, 2008", (w/ English Translation of Amended Claims), 23 pgs.
"Chinese Application Serial No. 200580038476.3, Response filed Nov. 7, 2011 to Office Action mailed Jun. 21, 2011", (w/ English Translation of Pending Claims), 29 pgs.
"Drag and drop available target indicator", Research Disclosure No. 341044, (Sep. 1, 1992), 711.
"European Application Serial No. 05851583.4, Decision mailed Oct. 15, 2012", 54 pgs.
"European Application Serial No. 05851583.4, Minutes of Oral Proceedings mailed Oct. 15, 2012", 21 pgs.
"European Application Serial No. 05851583.4, Office Action mailed Aug. 14, 2007", 7 pgs.
"European Application Serial No. 05851583.4, Response filed Jan. 13, 2012", 22 pgs.
"European Application Serial No. 05851583.4, Response filed Feb. 22, 2008 to Office Action mailed Aug. 14, 2007", 15 pgs.
"European Application Serial No. 05851583.4, Response filed Oct. 20, 2009 to Second Examination Report mailed Mar. 16, 2009", 26 pgs.
"European Application Serial No. 05851583.4, Second Examination Report mailed Mar. 16, 2009", 5 pgs.
"European Application Serial No. 05851583.4, Summons mailed Oct. 25, 2011", 9 pgs.
"International Application No. PCT/US2005/041078, International Preliminary Report on Patentability mailed May 15, 2007", 18 pgs.
"International Application No. PCT/US2005/041078, International Search Report mailed Aug. 12, 2006", 8 pgs.
"International Application No. PCT/US2005/041078, Written Opinion mailed Aug. 12, 2006", 17 pgs.
"International Application Serial No. PCT/US2005/041078, Partial International Search Report mailed Jun. 6, 2006", 3 pgs.
"Japanese Application Serial No. 2007-540425, Office Action mailed Apr. 1, 2011", (w/ English Summary), 6 pgs.
"Japanese Application Serial No. 2007-540425, Office Action mailed Jun. 8, 2012", (w/ English Summary), 4 pgs.
"Japanese Application Serial No. 2007-540425, Response filed Oct. 3, 2011 to Office Action mailed Apr. 1, 2011", (w/ English Translation of Amended Claims), 42 pgs.
"Japanese Application Serial No. 2007-540425, Response filed Oct. 9, 2012 to Office Action mailed Jun. 8, 2012", (w/ English Translation of Amended Claims), 32 pgs.
"Japanese Application Serial No. 2011-219668, Office Action mailed Feb. 22, 2013", (w/ English Summary), 3 pgs.
"Japanese Application Serial No. 2011-219668, Office Action mailed Sep. 24, 2013", (w/ English Summary), 3 pgs.
"Japanese Application Serial No. 2011-219668, Response filed Aug. 16, 2013 to Office Action mailed Feb. 22, 2013", (w/ English Translation of Amendments), 8 pgs.
"Incr Tk", ActiveState, ActiveTcl User Guide, ActiveTcl 8.4.1.0., (Nov. 6, 2002), 6 pgs.
"Microsoft". Windows XP Operating System, Version 2002, (2008), 3 pgs.
"Microsoft Active Accessibility", © 2011 Microsoft Corporation. [online] [retrieved on Dec. 6, 2011]. Retrieved from the Internet: <URL:http://msdn.microsoft.com/en-us/library/ms971350(d=printer).aspx>, (Aug. 2001), 3 pgs.
"Snapshots of Windows XP", Microsoft Windows XP, (2001), 4 pgs.
Abrams, M, "Device Independent Authoring with UIML", W3C Workshop on Web Device Independent Authoring. [online]. [retrieved on Oct. 27, 2011]. Retrieved from the Internet: <URL: http://www.w3.org/2000/10/DIAWorkshop/abram.html>, (Oct. 2000), 6 pgs.
Becker, C. H, et al., "Smart Application Selection Assistant", IBM Technical Disclosure Assistant, (Feb. 1995), 353-355.
Hearst, M. A., "Chapter 10—User Interfaces and Visualization", In: Modern Information Retrieval, Baeza-Yates, R., et al., Editors, ACM Press, Addison Wesley Longman Limited, Harlow, Essex, England, (1999), 257-339.
Klementiev, D, "Software Driving Software: Active Accessibility-Compliant Apps Give Programmers New Tools to Manipulate Software", MSDN Magazine. [online]. [retrieved on Feb. 15, 2013]. Retrieved from the Internet: <URL: http://msdn.microsoft.com/en-us/magazine/cc301312(printer).aspx>, (Apr. 2000), 11 pgs.
Sinclair, R, "Microsoft Active Accessibility Architecture: Part 2", (c) 2011 Microsoft Corporation. [online]. [retrieved on Oct. 27, 2011]. Retrieved from the Internet: <URL: http://msdn.microsoft.com/en-us/library/ms971352(d=printer).aspx, (Jul. 2000), 10 pgs.
Sinclair, R, "Microsoft Active Accessibility: Architecture", © 2011 Microsoft Corporation. [online]. [retrieved on Oct. 27, 2011]. Retrived from the Internet: <URL: http://msdn.microsoft.com/en-us/library/ms971310(d=printer).aspx>, (May 2000), 10 pgs.
"Australian Application Serial No. 2012200220, Examination Report No. 1 mailed Oct. 17 2014", 4 pgs.
"Australian Application Serial No. 2012200220, Subsequent Examiners Report mailed Apr. 8, 2015", 3 pgs.

* cited by examiner

HIGHLIGHTING ITEMS FOR SEARCH RESULTS

CLAIM OF PRIORITY

This patent application claims the benefit of priority of U.S. patent application Ser. No. 10/985,630, filed on Nov. 10, 2004, which is hereby incorporated by reference herein in its entirety.

FIELD OF THE INVENTION

The present invention relates generally to user interfaces for presenting search results, and more particularly to techniques for highlighting icons associated with search results.

BACKGROUND OF THE INVENTION

Most computer operating systems provide controls that allow the user to specify settings for various preferences. These controls include text fields, sliders, radio buttons, check boxes, and the like. For example, a typical operating system such as MacOS X contains controls for specifying such preferences as: the length of time before a screen saver is activated; the speed with which the onscreen cursor moves in response to mouse input; the current date and time; the volume of the external speakers; and the like.

Typically, these controls are organized in a series of preference panes, which are collectively grouped under a title such as "System Preferences" or "Control Panels". A user can access a control by clicking on an icon or menu command to activate System Preferences. In response, the system displays a window containing a number of icons, where each icon represents a preference pane that contains a set of controls related to a particular component or feature of the system.

For example, if a user wishes to change a network password, the user would generally perform the following steps:
  Activate a System Preferences icon or menu command, to bring up the System Preferences window including various preference icons;
  Click on a Network icon, to bring up the corresponding preference pane, which includes controls related to network passwords;
  Enter the new password;
  Click on the OK button to save the new password and dismiss the preference pane; and
  Click on the close button to dismiss the System Preferences window.

As computers and operating systems become increasingly complex, the number of preference controls grows, as does the number of preference panes. As a result, users (particularly novice users) have a difficult time finding the particular control they are looking for. A user may know the general nature of the control he is looking for, but may not know which preference pane contains that control. For instance, continuing the above example, if the user is unfamiliar with the organizational scheme of the preference panes, he or she may not know where to look for the network password entry control. Searching among various preference panes and/or consulting printed or electronic documentation can be frustrating and time-consuming.

In particular, when a new version of the operating system is released, it is common for controls to be moved from one pane to another; users who are used to the previous version of the operation system may be unfamiliar with the new locations of controls.

Once a user has become familiar with the organizational scheme for the preference panes, he or she can more easily find a particular control when it is needed. Accordingly, it is beneficial to have some mechanism for training the user as to the locations of various controls, without forcing the user to consult manuals or other documentation.

In this context, what is needed is a system and method for assisting a user in locating and accessing preference controls, even when the user is unfamiliar with the organizational scheme for the preference panes. What is further needed is a system and method for training the user so that, over time, he or she becomes more familiar with the locations of various preference controls. What is further needed is a system and method for assisting a user in locating other types of system resources, data, or the like.

SUMMARY OF THE INVENTION

The present invention provides a search capability to allow a user to easily locate an item in a computer system, including for example a data item, preference control, file, folder, control, or other system resource associated with a search result. In one embodiment, a user enters a search term (or a portion thereof) in a search field associated with one or more resource types that may be searched. The user may be presented with a pop-up menu containing a list of likely matches. The user selects the desired data item, preference control, or other resource from the pop-up menu, and the corresponding document, preference pane, or other resource or container containing the selected item is displayed.

In one aspect, as the user enters the search term (or portion thereof), certain icons within a preferences window or other set of container items are highlighted automatically. Specifically, those icons that represent containers containing items that match the search term (such as files containing the term, or preference panes having controls that match the search term) are highlighted. These results may be updated dynamically as the user continues to enter his search criteria.

In one aspect, different types of highlighting are used depending on the degree of certainty as to which preference pane, or container, is likely to contain the correct match. When there is relative uncertainty as to which data item, control, or resource is being sought, icons for preference panes, or containers, containing the search term are highlighted using a first type of highlighting. When sufficient search term input has been provided that yields greater certainty as to which item is being sought (for example, if only one preference pane, or container, contains a matching control), a second, more prominent type of highlighting is used.

By highlighting icons and items in this manner, the present invention provides a training mechanism that allows a user to learn, over time, where to find various data items, preference controls, and/or other resources. In one embodiment, this training mechanism is implemented in a manner that is relatively innocuous, in that it does not interfere with the user's normal operation of the system; the user is free to ignore the highlighting if he or she wishes, and simply to enter search terms (or portions thereof) and select from the pop-up menu that appears.

In one aspect, the pop-up menu results are updated, and highlights appear and disappear, automatically as the user types in the search field. Thus, the user need not hit Enter, or any other key, to activate the search and highlight functionality of the present invention.

The functionality of the present invention is not limited to preference controls. As described in more detail below, the present invention can be implemented in any context where it is desirable to dynamically highlight icons or locations in response to a search term, while the search term is being entered. For example, the present invention can be implemented in a file manager, where folders or directory icons are dynamically highlighted based on whether they contain files that match the search term (or portion thereof). Alternatively, the highlighting techniques described herein can be used in any application, situation, or context, regardless of whether the highlighting is performed in response to entry of a search term.

In one aspect, the present invention searches for alternative terms as well as literal matches. Common misspellings, descriptive text, and/or alternative terminologies are associated with controls, so that if the user enters a search term that is misspelled or that uses alternative terminology, a match is still indicated.

BRIEF DESCRIPTION OF THE DRAWINGS

The accompanying drawings illustrate several embodiments of the invention and, together with the description, serve to explain the principles of the invention.

Figure 1:
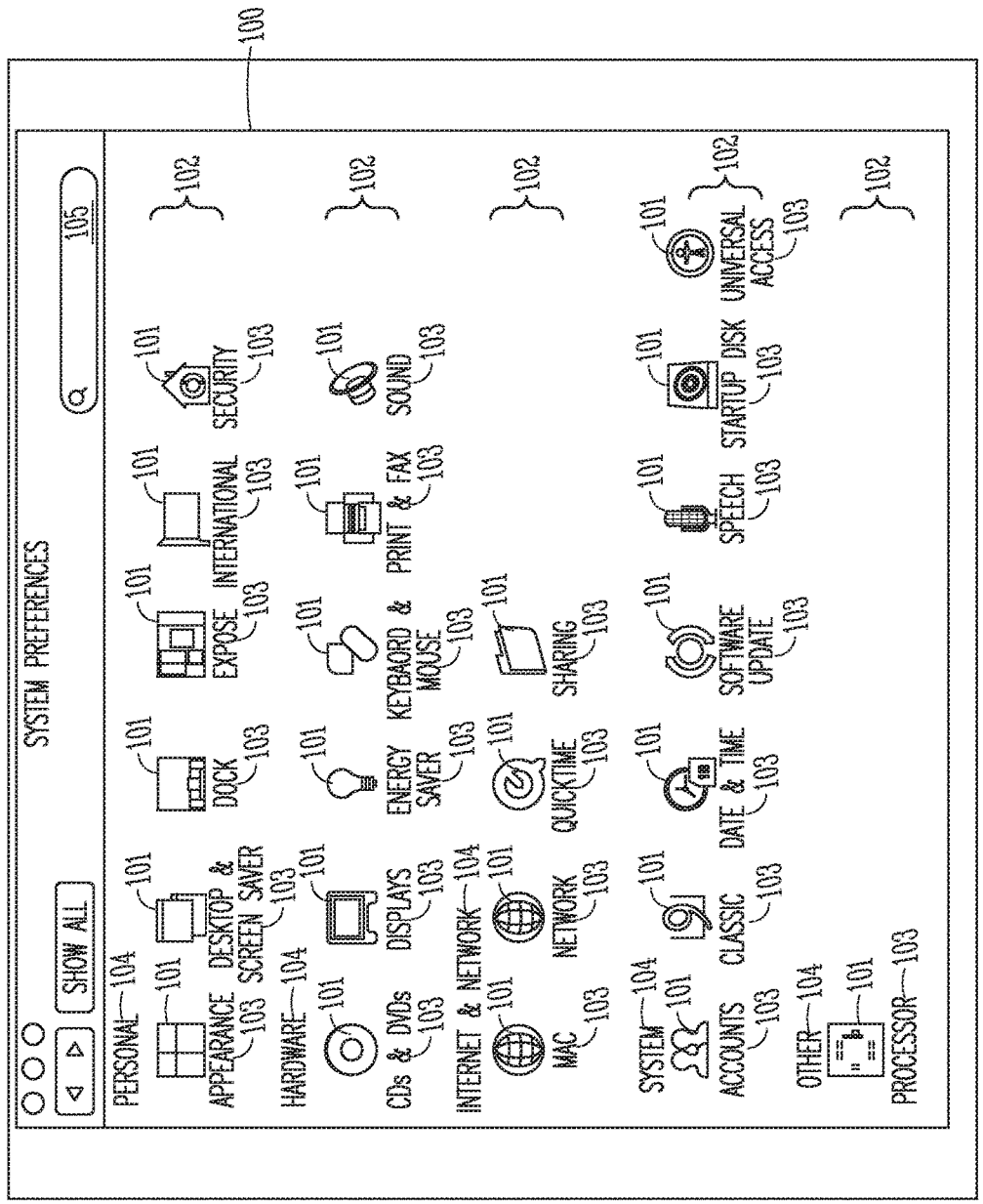
FIG. 1 is a screen shot depicting an example of a system preferences window according to one embodiment of the present invention.

One skilled in the art will recognize that these Figures are merely examples of the operation of the invention according to one embodiment, and that other user interface arrangements and modes of operation can be used without departing from the essential characteristics of the invention.

DETAILED DESCRIPTION OF THE EMBODIMENTS

The present invention is now described more fully with reference to the accompanying Figures, in which several embodiments of the invention are shown. The present invention may be embodied in many different forms and should not be construed as limited to the embodiments set forth herein. Rather these embodiments are provided so that this disclosure will be complete and will fully convey the invention to those skilled in the art.

For illustrative purposes, the invention is described in connection with a mechanism for locating and activating a preference pane containing a preference control. Various specific details are set forth herein and in the Figures, to aid in understanding the present invention. However, such specific details are intended to be illustrative, and are not intended to restrict in any way the scope of the present invention as claimed herein. In particular, one skilled in the art will recognize that the invention can be used to assist the user in locating items of any type, including for example data items, files, telephone numbers, people, addresses, folders and other containers, devices, and any other type of data or resource available to a user via a computer interface. In other words, in the following description, preference controls are merely an example of items to be located, and preference panes are examples of containers containing items. In addition, the particular screen layouts, appearance, and terminology as depicted and described herein, are intended to be illustrative and exemplary, and in no way limit the scope of the invention as claimed.

In one embodiment, the present invention is implemented in a conventional personal computer system, such as an iMac, Power Mac, or PowerBook, (available from Apple Computer, Inc. of Cupertino, Calif.), running an operating system such as MacOS X (also available from Apple Computer, Inc.). It will be recognized that the invention may be implemented on other devices as well, such as handhelds, personal digital assistants (PDAs), mobile telephones, consumer electronics devices, and the like. The invention may be embodied in software that runs on the personal computer. The invention may be included as add-on software, or it may form part of the operating system itself, or it may be a feature of an application that is bundled with the computer system or sold separately. The various features of the invention as described herein include output presented on a display screen that is connected to the personal computer. In addition, the invention makes use of input provided to the computer system via input devices such as a keyboard, mouse, touchpad, or the like. Such hardware components, including their operation and interactions with one another and with a central processing unit of the personal computer, are well known in the art of computer systems and therefore are not depicted here. Several Figures are presented as screen shots depicting examples of the user interface as it might appear on a display screen or other output device.

Referring now to FIG. 1, there is shown a screen shot depicting an example of a system preferences window 100 according to one embodiment of the present invention. In one embodiment, window 100 is activated in response to a user command, for example by clicking on an icon (not shown) or making a selection from a menu (not shown).

Window 100 includes a number of icons 101 that provide access to preference panes. The user can access a preference pane, for example, by navigating an on-screen cursor or selection tool to the desired icon 101 and activating the icon 101 (for example, by double-clicking a mouse button, or by hitting an activation key on a keyboard, or the like). In one embodiment, each icon 101 is a visual representation of the type of preferences that can be controlled from its associated preference pane. In one embodiment, each icon 101 also has a text label 103 providing additional information as to the type of preferences that can be controlled via the associated pane. The present invention does not require that icons 101 be used, or that any particular visual characteristic of icons 101 be present; in fact, the present invention can operate, for example, with a simple text list, wherein each item in the list corresponds to a preference pane.

In the example of FIG. 1, icons 101 are organized into several categories, each represented by a band 102 within window 100. Each category has a title 104. Thus, for example, the Hardware category includes icons 101 that provide access to hardware-related preference panes (such as CDs & DVDs, Displays, Energy Saver, Keyboard & Mouse, and the like). This category-based organizational scheme is not essential to the operation of the present invention.

Figure 2:
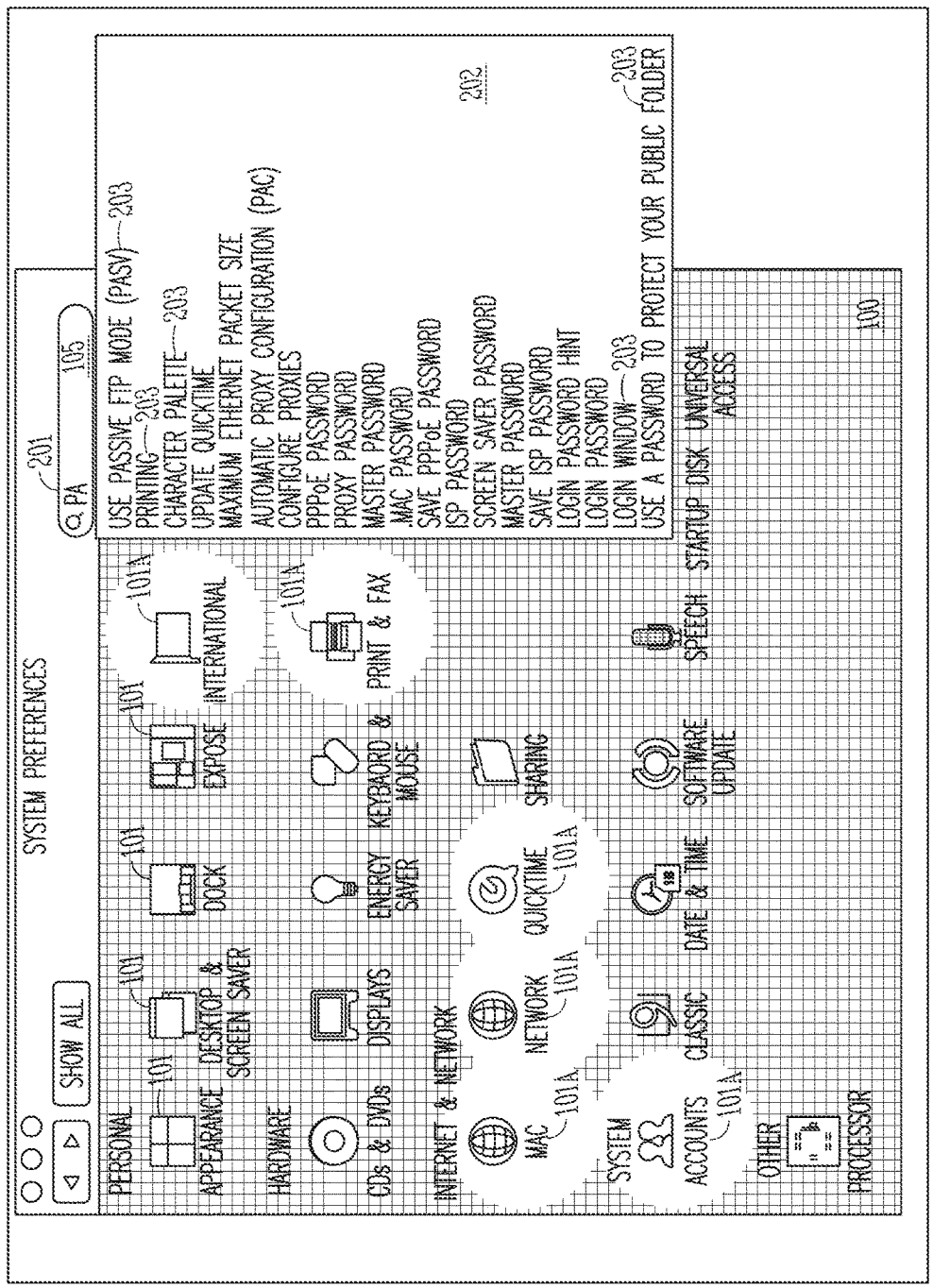
FIG. 2 is a screen shot depicting a first type of highlighting of icons after the user has entered a two-character query string, according to one embodiment of the present invention.

The present invention makes it easier for a user to find a particular preference control when he or she does not know which preference pane contains the desired control. The user types a search query in search field 105. Referring now to FIG. 2, as the user enters query text 201, pop-up menu 202 appears, showing names of controls that match the entered text. In the example shown, the user has entered "pa". Menu 202 includes names of controls that contain the text string "pa".

In one embodiment, as will be described in more detail below in connection with FIG. 6, a search table 601 is maintained internally, and can be updated periodically if desired. In table 601, each preference control 504 is associated with one or more text strings and/or other metadata, including for example a title for control 504, other text that appears within control 504, and/or alternative and descriptive text strings for preference control 504. Thus, search results in menu 202 can include not only names of controls 504, but also descriptive text and/or alternative text for which there is a match with query text 201. In one embodiment, search table 601 is constructed ahead of time by automatically grabbing all text that appears in each control 504 (possibly omitting commonly used words such as prepositions, articles, and the like). For example, referring briefly to FIG. 5, search table entries pointing to the various controls 504 in preference pane 500 can be constructed by grabbing text strings such as "proxy," "password," "server," "passive," and the like. In another embodiment, search table 601 is manually constructed by a developer, author, or other individual.

Accordingly, in one embodiment, menu 202 includes some names of controls 504 that do not themselves contain the text string "pa", but that are associated with descriptive text and/or alternative text that does contain "pa". For example, Printing control 504 is associated with alternative text that specifies that it is used for controlling paper selection options. In other words, users may be searching for a paper selection control 504, without realizing that the appropriate preference control 504 is actually called "printing". Thus, when the user enters "pa" as query text 201, "Printing" appears as one of the items 203 in menu 202, since "pa" is a match for "paper selection." Such alternative text can include common misspellings, as well as alternative terminology that may be used in other operating systems, or that may be commonly used by users or other individuals when referring to a particular feature or function. For example, controls 504 associated with a user's desktop background may have alternative text including the word "wallpaper", since "background" and "wallpaper" are terms commonly used in connection with different operating systems to refer to the same general functionality.

Thus, search results as presented in menu 202 include not only those controls 504 whose names match query text 201, but also those controls 504 that have matching descriptive or alternative terms.

In one embodiment, menu 202 only includes results corresponding to preference controls 504 that apply to installed features. If a particular hardware or software function is not installed on the user's computer, then any preference controls 504 that apply to that feature are omitted from menu 202. In one embodiment, the exclusion of such controls 504 is facilitated by maintaining, in table 601, keys that indicate the hardware and/or software configurations to which each entry in table 601 applies. If the hardware and/or software configuration for a particular entry in table 601 is not present in the system, the entry is excluded from searches. In one embodiment, if the user enters query text 201 that refers to an uninstalled feature, he or she is notified that the feature is not present (for example, by presenting a dialog box, or by placing explanatory text within menu 202). In one embodiment, the user is given an opportunity to click on a link or button to install the feature.

For example, if the user searches for BlueTooth in a system that does not have BlueTooth, any BlueTooth-related preference controls 504 will be omitted from the search results. A dialog box or other explanatory text is presented to explain to the user that the system does not have BlueTooth.

In one embodiment, when displaying a menu item representing an alternative terminology match, the alternative terminology is displayed alongside or instead of the menu item, so as to clarify the reason for the appearance of the item on menu 202. For example, if the user types "wa", and one of the menu items is "desktop background", the menu item appears as "Desktop background (wallpaper)" to clarify that the two terms refer to the same functionality and to tell the user why the term appeared in response to his or her query. In another embodiment, only the alternative terminology appears as the menu item ("Wallpaper"). In yet another embodiment, only the primary terminology appears ("Desktop background"), with no reference to the alternative terminology. In yet another embodiment, only the primary terminology appears, but it is displayed using some distinctive visual characteristic (such as a different color), or is accompanied by some indicator to clarify that it is an alternative text match.

As the user enters query text 201, and concurrently with the display of menu 202, certain icons 101 are highlighted to indicate that they represent preference panes 500 that contain controls 504 referenced in menu 202. In one embodiment, a distinctive type of highlighting is used, as depicted for icons 101A in FIG. 2. This highlighting takes the form of a spotlight effect, in which most of window 100 is darkened slightly, except for a circular area immediately surrounding each icon 101A. Thus, these circular areas appear slightly brighter than does the remainder of window 100, so that the overall effect is that of a spotlight shining on each icon 101A. The effect is reinforced by a gradual transition of brightness from the central area for each icon 101A to the darker region. In alternative embodiments, the spotlight effect can be accomplished by brightening the area surrounding the highlighted icons 101A and leaving the remainder of window 100 at the same brightness as before. In yet other embodiments, other types of highlighting may be used.

"Highlighting," as used herein, is not limited to the specific spotlight effect described and illustrated. Rather, the term "highlighting" is intended to refer to any form of effect by which some resources or items are distinguished from others. Examples of such effects include changing the size, shape, color, contrast, and/or other visual features of an associated name, icon, or other item. In other embodiments, highlighting refers to displaying one or more items in a specific area of the screen or window, or rearranging some items within a display area to indicate that they are highlighted. In yet other embodiments, highlighting is accomplished using non-visual means; for example, highlighted items can produce a distinctive sound when pointed to by a cursor, or they can have a distinctive tactile characteristic. Other alternatives will be apparent to one skilled in the art.

In one embodiment, the presentation of menu 202 and the highlighting of certain icons 101A take place automatically as the user types query text 201 in query field 105. Thus, the user need not hit an Enter key or otherwise manually activate the search command. Menu 202 and highlights of icons 101A are updated automatically as the user enters additional characters in field 105, or as the user hits the backspace key to delete characters. In general, typing additional characters lengthens query text 201 string, thus narrowing the search and causing menu 202 to include fewer items (and also causing fewer icons 101A to be highlighted); conversely, deleting characters shortens query text 201 string, thus broadening the search and causing menu 202 to include more items (and also causing more icons 101A to be highlighted). In one embodiment, processing is performed as each character is input, and feedback is provided substantially instantaneously upon receipt of the input, for example as described in U.S. Pat. No. 4,704,703 for "Dynamic Input Processing System."

In an alternative embodiment, searches are performed in response to a certain trigger event. For example, a search may be initiated or updated whenever the user pauses while typing query text 201; a predetermined minimum pause length can be established. Alternatively, a search may be initiated or updated when the user requests it, by hitting an Enter key or search button, or the like.

In one embodiment, the user can click on any icon 101 or 101A at any time to activate corresponding preference pane 500, regardless of whether the icon 101 or 101A is currently highlighted or not, and regardless of whether menu 202 is currently displayed. In another embodiment, whenever menu 202 is displayed, non-highlighted icons 101 are temporarily disabled, although the user can click on a highlighted icon 101A to activate a preference pane 500.

Figure 3:
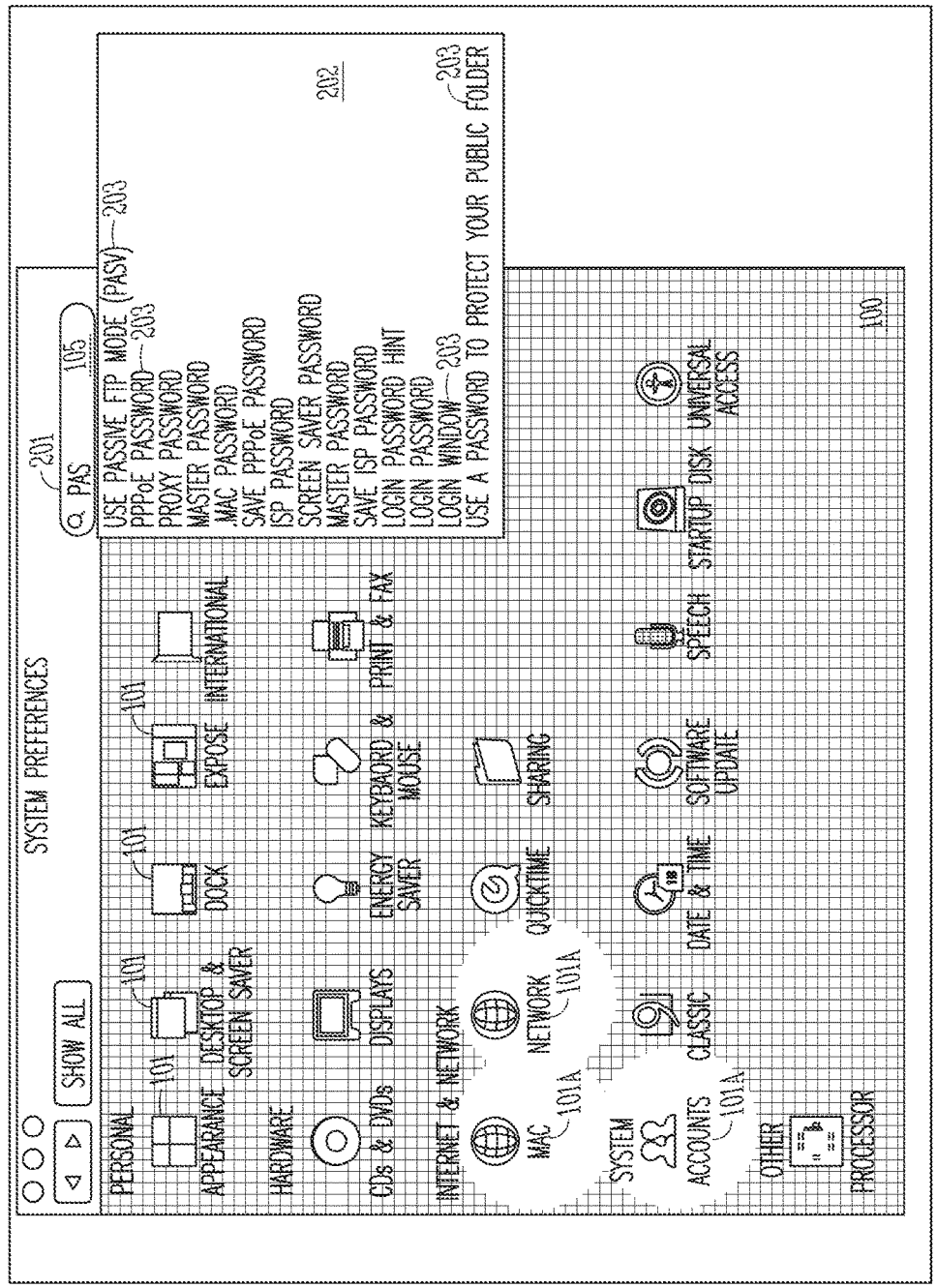
FIG. 3 is a screen shot depicting a first type of highlighting of icons after the user has entered a three-character query string, according to one embodiment of the present invention.

Referring now to FIG. 3, there is shown a continuation of the same example after the user has pressed another keystroke to add a character to query text 201, which now reads "pas". In one embodiment, menu 202 and icon 101 highlighting are automatically updated to reflect the new query text 201. Specifically, in this example, menu 202 now contains items 203 that contain "pas" or that have equivalent text that contains "pas"; menu 202 contains fewer items than it did in FIG. 2, since there are fewer matches for "pas" than there were for "pa". Similarly, the number of highlighted icons 101A has been reduced, so as to include only those icons 101A that represent preference panes 500 that contain controls 504 referenced in menu 202.

In one embodiment, icons 101A having text labels 103 that match query text 201 are highlighted in the same manner as icons that represent 101A preference pans 500 that contain controls 504 whose names match query text 201.

In one embodiment, icons 101A are highlighted if they represent preference panes 500 that contain controls 504 referenced in menu 202, whether or not the text labels 103 for those icons 101A match query text 201.

In one embodiment, a different type of highlight effect is used to indicate icons 101A having text labels 103 that match query text 201, as opposed to icons 101A that contain controls 504 whose names match query text 201.

In one embodiment, different types of highlighting are used depending on the degree of certainty as to which preference pane 500 is likely to contain the correct match. When there is relative uncertainty as to which preference control 504 is being sought, icons 101 for the preference panes 500 containing the search term are highlighted using a first type of highlighting. When sufficient search term input has been provided that yields greater certainty as to which control is being sought (for example, if only one preference pane 500 contains a matching control), a second, more prominent type of highlighting is used.

Figure 4:
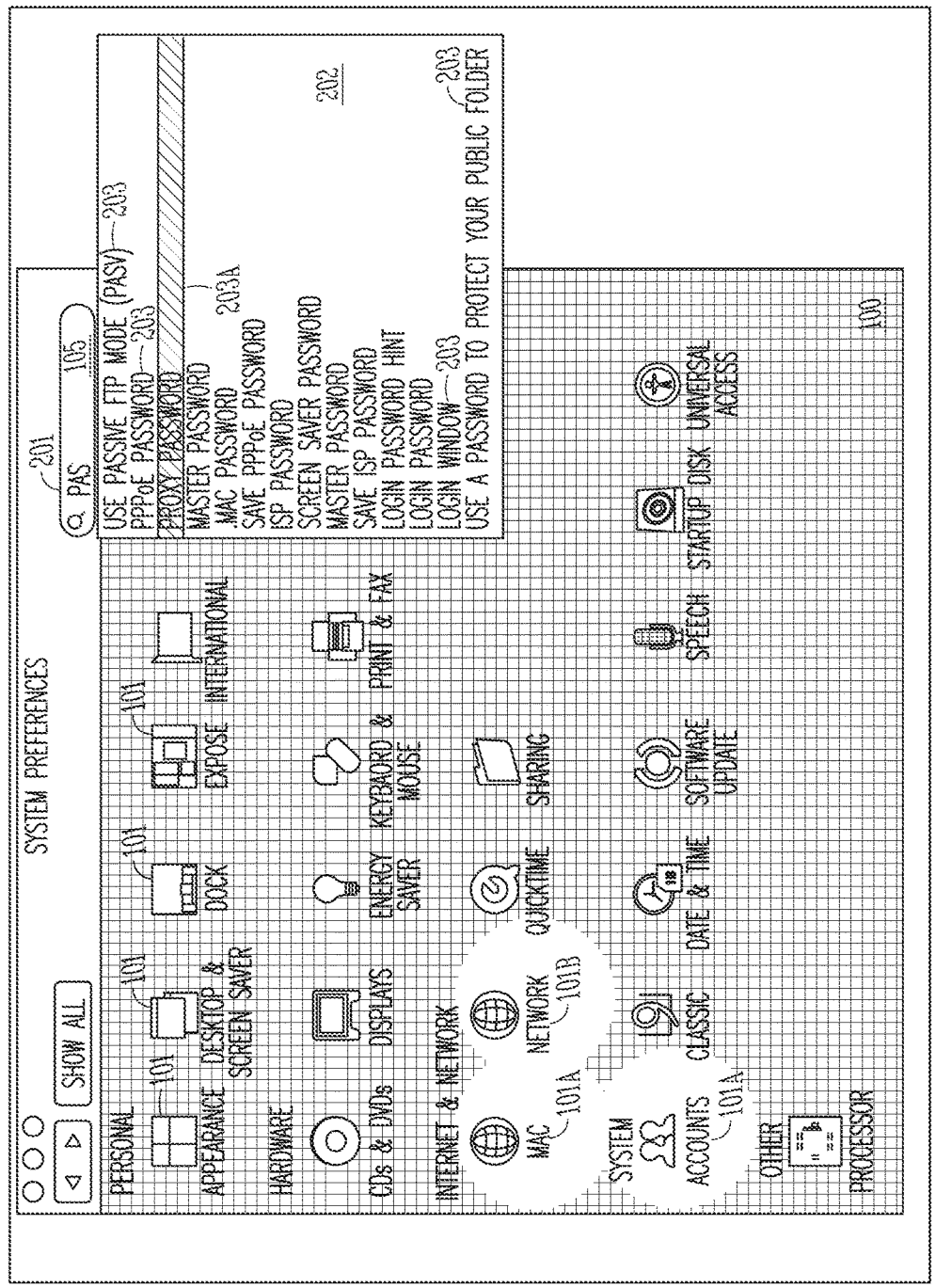
FIG. 4 is a screen shot depicting two types of highlighting of icons, according to one embodiment of the present invention.

At any time, the user can navigate within menu 202, for example by clicking up/down arrows on a keyboard, or by moving an on-screen cursor to a desired menu item 203. Referring now to FIG. 4, there is shown an example wherein the user has navigated to menu item 203A, which is a "Proxy password" menu item. Menu item 203A is displayed in inverse video, to show that it is currently highlighted or selected. One skilled in the art will recognize that any other distinctive visual technique can be used to indicate a highlighted or selected menu item 203A.

In one embodiment, in response to the user having highlighted or selected menu item 203A, icon 101B, representing preference pane 500 that contains control 504 referenced by menu item 203A, is highlighted. In one embodiment, icon 101B is highlighted using a different type of highlighting that is visually distinctive from the highlighting used for icons 101A. By highlighting icon 101B in this manner, the present invention provides a useful mechanism for teaching the user where to find various preference controls 504; the user can navigate within menu 202 and see which icon 101 is highlighted with the second highlighting technique for each menu item 203. In the example shown, icon 101B represents Network preference pane 500, which contains preference controls 504 related to network operations.

In one embodiment, the second highlighting, technique is brighter and sharper than the first highlighting technique, so as to reinforce the notion that it is a "stronger" form of highlight. For example, the region surrounding icon 101B is brighter than the region surrounding icons 101A. Also, the transition from the bright region to the darker area is much sharper; in one embodiment, it is a discontinuous transition, whereas in another embodiment it is a less gradual transition than the transition found in the regions surrounding icons 101.

In other embodiments, other types of visual highlights can be used. Icons 101A and 101B may be given different types of highlights, or the same type. Alternatively, in another embodiment, when a menu item 203A is selected or highlighted, only the corresponding icon 101B is highlighted (i.e., the icon for preference pane 500 that contains control 504 corresponding to menu item 203A), and other icons for preference panes 500 containing controls 504 other than control 504 corresponding to menu item 203A are not highlighted at all, even if menu items 203 for those controls 504 appear in menu 202.

In one embodiment, menu item 203A is automatically highlighted (and corresponding icon 101B is highlighted) in response to certain trigger events. For example, when there is a whole-word match between query text 201 and item 203A, automatic highlighting may take place.

The user can cause a control to be displayed on screen by activating (for example by clicking on) the corresponding menu item 203 from menu 202. This causes preference pane 500 containing control 504 to be displayed on the screen. In one embodiment, if preference pane 500 containing control 504 has various parts, tabs, sub-panes, or sections, the part, tab, or section that contains control 504 is brought to the foreground. In one embodiment, the particular control corresponding to the selected menu item 203 is highlighted or selected automatically, so that the user is able to manipulate control 504 immediately without having to search for it on the screen. For example, if control 504 is a text field, the text cursor may be active and ready to receive input within the text field.

In one embodiment, when the user selects an item 203 from menu 202, the corresponding icon 101 momentarily blinks, so as to further reinforce the connection between menu items 203 and their corresponding icons 101.

In one embodiment, when a user clicks on an icon 101A while an item 203A is highlighted in menu 202, preference pane 500 containing control 504 referenced by item 203A is displayed. Again, in one embodiment, if preference pane 500 containing control 504 has various parts, tabs, sub-panes, or sections, the part, tab, or section that contains control 504 is brought to the foreground. As described in the previous paragraph, in one embodiment, the particular control corresponding to the highlighted menu item 203A is highlighted or selected automatically, so that the user is able to manipulate control 504 immediately without having to search for it on the screen.

Figure 5:
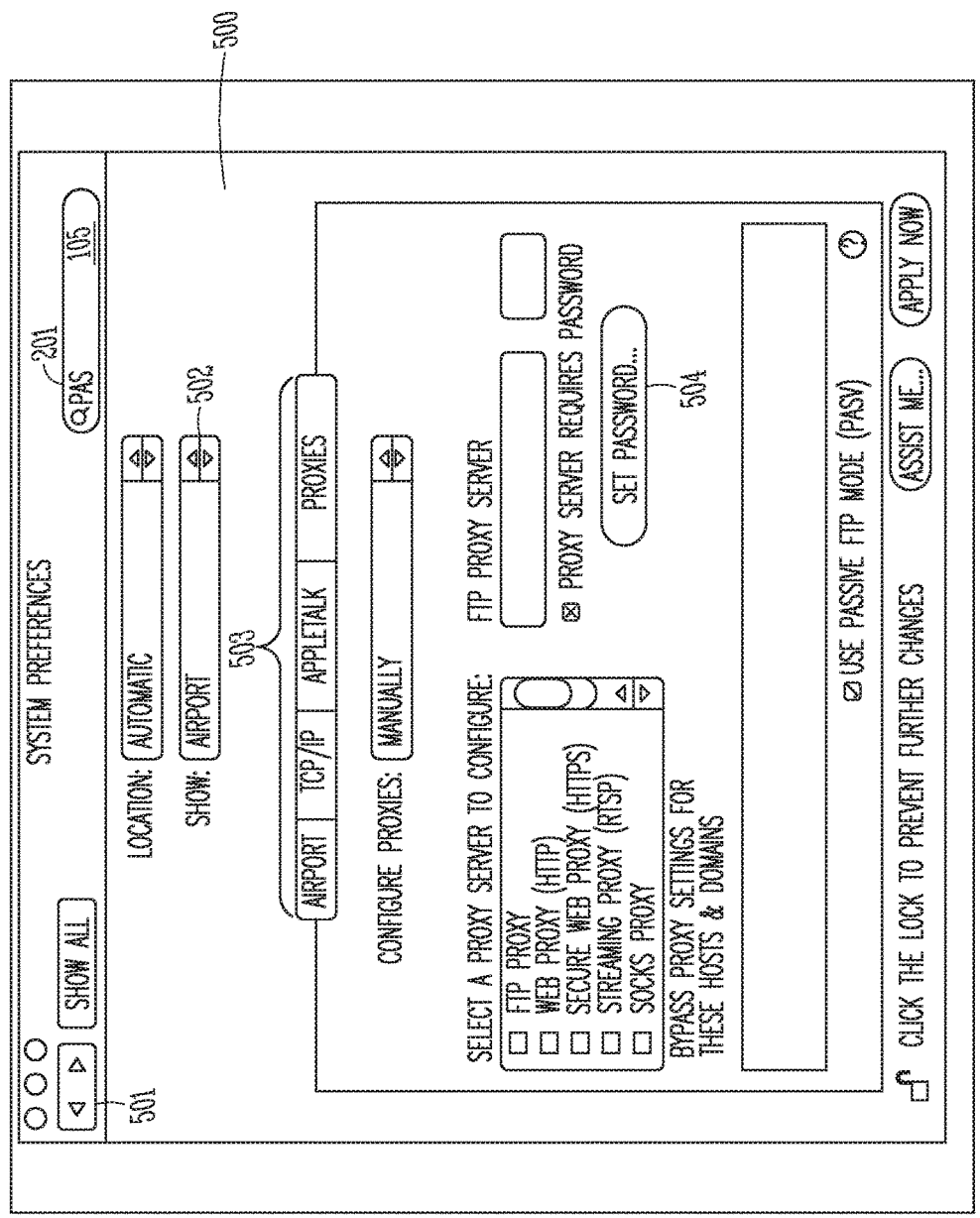
FIG. 5 is a screen shot depicting a preference pane after user selection of an item from a pop-up menu, according to one embodiment of the present invention.

Referring now to FIG. 5, there is shown an example of a preference pane 500 that is displayed in response to user activation of the "proxy password" menu item 203A in FIG. 4. Preference pane 500 is a Network preference pane; as indicated above, Network preference pane 500 corresponds to the network icon 101B shown in FIG. 4.

In the example of FIG. 5, Network preference pane 500 has four sub-panels, related to various types of network operations; the user can navigate among the sub-panes by clicking on selector 502. Indicator 503 shows the names of the four sub-panels: AirPort, TCP/IP, AppleTalk, and Proxies. The currently active sub-pane is indicated by highlighting "Proxies" in indicator 503. As described above, this sub-pane is automatically brought to the foreground because it is the section of pane 500 that contains the control 504 for setting proxy passwords (since "Proxy password" was the menu item 203A activated by the user in FIG. 4).

The user can navigate back to system preferences window 100 by clicking on arrow 501. The user can perform additional searches by typing or editing query text 201 in query field 105.

The present invention provides a mechanism for allowing a user to quickly locate the preference control 504 he or she is interested in. In addition, the invention serves to train the user as to which preference panes 500 contain which preference controls 504. By highlighting various icons 101 as the user enters query text 201, and by providing additional distinctive highlighting in response to navigation within menu 202, the present invention provides the user with a quick mechanism for determining which preference panes 500 contain controls 504 that are of interest.

The present invention can be used to provide centralized access to many different types of controls 504 and files. For example, in one embodiment, if no matching system preference controls 504 are found, the system of the present invention displays application preference controls and/or help text entries that match query text 201. In another embodiment, matching application controls and/or help text entries are presented regardless of whether matching system preference controls 504 are found. Search results for application preference controls and/or help text entries can be presented within the same menu 202 as those for system preference controls 504; in one embodiment a different color or other distinctive visual characteristic is used to clarify the difference between the types of controls. In another embodiment, the user can select whether and how application preference controls and/or help text entries are displayed in response to queries.

Figure 6:
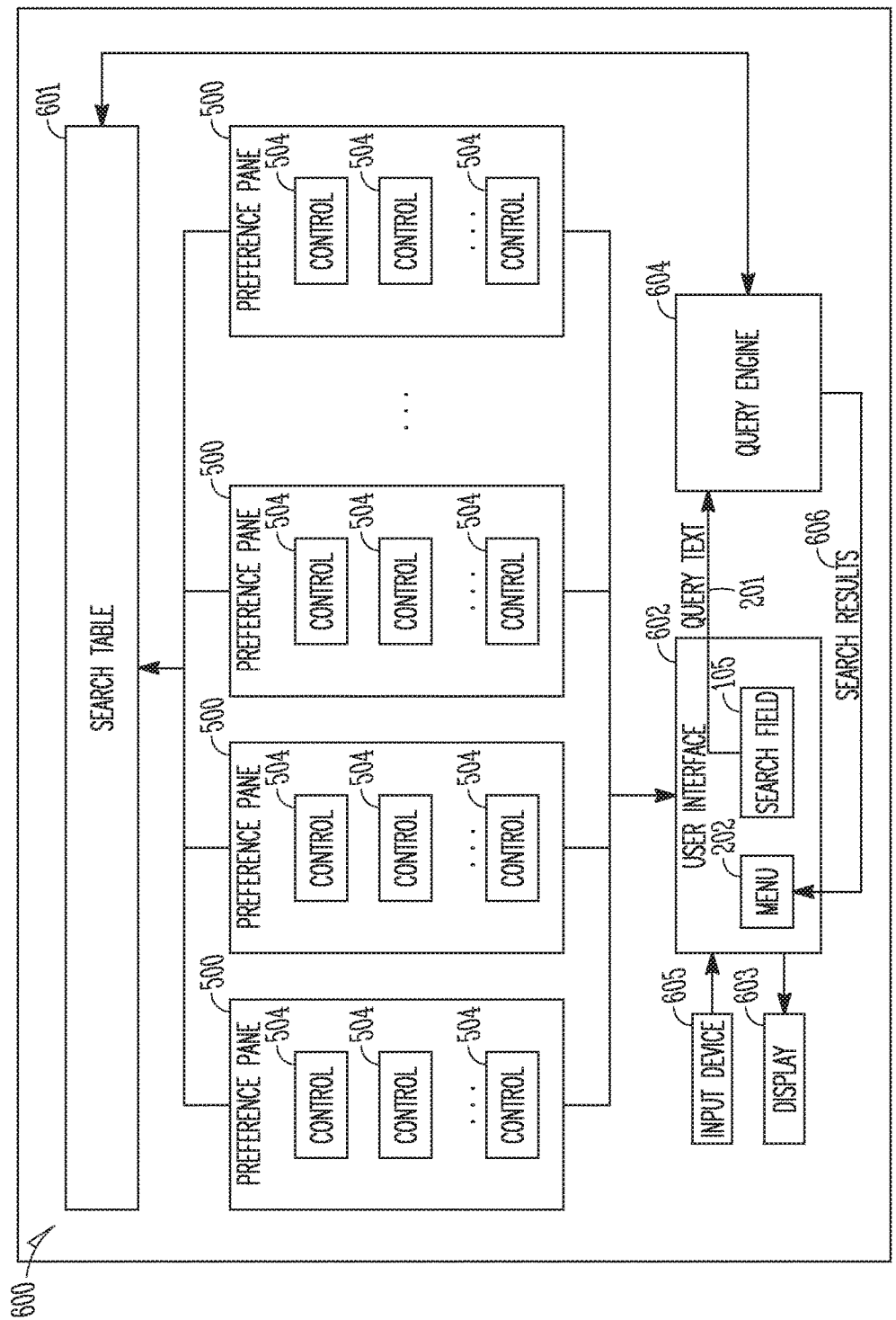
FIG. 6 is a block diagram depicting a functional architecture for implementing the invention according to one embodiment.

Referring now to FIG. 6, there is shown a block diagram depicting a functional architecture for implementing the invention according to one embodiment. As described above, the various components of FIG. 6 may be implemented in software. System 600 includes the various preference panes 500 that can be depicted as part of the overall preferences functionality. Each preference pane 500 includes any number of preference controls 504. Search table 601 maintains search terms and their relationships to preference panes 500 and controls 504; as described above, search table 601 may include names for controls 504 as well as alternative and/or descriptive text. Search table 601 may be automatically constructed and updated from preference panes 500 and controls 504, or it can be manually constructed and updated. User interface 602 accepts input from input device 605 and outputs results via display 603. User interface 602 includes search field 105 for accepting user entry of query text 201, as described above. User interface 602 also includes menu 202, which presents search results as menu items 203, as described above. Query engine 604 is a software component that takes query text input 201 from search field 105, compares it with entries in search table 601, and generates search results 606 to be displayed in menu 202. Menu 202 is a component of user interface 602 that is output via display device 603. When preference panes 500 and/or controls 504 are to be displayed, user interface 602 handles the display and interaction with these elements as well.

As will be apparent to one skilled in the art, the invention is not limited to the particular application set forth in the above description, which is intended to be exemplary. For example, the invention can be used in a file manager application, where icons represent files, folders, or directories. In such a context, the system of the invention searches for query text 201 within files, and highlights those icons that represent files, folders, or directories that contain query text 201. In one such embodiment, icons 101 represent folders, and the system of the invention searches for query text 201 within file names for files within the various folders. In another such embodiment, the system of the invention searches for query text 201 within the body of files within the folders. In yet another such embodiment, icons represent files, and the system of the invention searches for query text 201 within the body of files corresponding to icons 101. The above-described techniques for highlighting icons 101, and for presenting menu items 203 in menu 202, and for navigating, highlighting, and selecting menu items 203, can be applied to such an embodiment as well.

In one embodiment, the present invention is implemented as a technique for highlighting onscreen items in any context, and is not limited to a context where search results are being presented. For example, the above-described spotlight effect can be used in any situation where it is desirable to visually distinguish one (or more) onscreen item from other onscreen items. Referring again to FIG. 2, most of window 100 is darkened slightly, except for a circular area immediately surrounding each icon 101A. Thus, these circular areas appear slightly brighter than does the remainder of window 100, so that the overall effect is that of a spotlight shining on each icon 101A. The effect is reinforced by a gradual transition of brightness from the central area for each icon 101A to the darker region. In alternative embodiments, the spotlight effect can be accomplished by brightening the area surrounding the highlighted icons 101A and leaving the remainder of window 100 at the same brightness as before. In yet other embodiments, other types of highlighting may be used. In any context where it is desirable to present two different types of highlights, a sharper and/or brighter spotlight can be used, as discussed above in connection with FIG. 4.

Examples of contexts for highlighting onscreen items in this manner are: to indicate which item(s) have been selected by a user, or which item(s) is/are relevant to an operation being performed, or which item(s) is/are newly added to a set, or which item(s) is/are newly installed or updated, or which item(s) have alerts to be brought to the attention of the user. Another example is to highlight probable destination(s) for an item that has been selected or is being dragged on the screen; for example, if the user selects an icon representing an email message (or other item) and starts to drag it on the screen, likely destinations can be highlighted using the visual techniques described herein. Other contexts and situations will be apparent to one skilled in the art.

One skilled in the art will recognize that the spotlight effect can be implemented using any shape and size for the area immediately surrounding each icon 101A, and is not limited to circular areas. For example, in other embodiments, the brighter (or otherwise visually distinguished area) can be an oval, square, triangle, or any other regular or irregular polygon, and can be of any size. In some embodiments, the size and/or shape can indicate the nature of the highlight, the degree of confidence in the selection, and/or can be dictated by user preference. In other embodiments, the size and/or shape can vary according to current conditions or context: for example, if many items are highlighted simultaneously, the sizes of the spotlight can be reduced in order to make room for one another.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems may be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages may be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A method for highlighting items corresponding to search results, comprising:
   displaying a plurality of items in a user interface display;
   while maintaining display of the plurality of items:
      receiving a first user input representing at least a portion of a search term;
      in response to receiving the first user input, highlighting at least a subset of the plurality of items, the subset of the plurality of items including:
         a first item that represents at least a one item having metadata that at least partially matches the first user input;

a second item that represents at least one item having metadata that at least partially matches the first user input; and a third item that represents at least one item having metadata that represents at least one item having metadata that at least partially matches the first user input;

while the first item, the second item and the third item are highlighted, receiving a second user input representing an additional portion of the search term; and in response to receiving the second user input, incrementally changing the displaying and highlighting of the plurality of items in response to the second user input, including:

maintaining the highlighting of the first item, wherein the first item represents at least one item having metadata that at least partially matches the first user input and the second user input representing the additional portion of the search term;

maintaining the highlighting of the second item, wherein the second item represents at least one item having metadata that at least partially matches the first user input and the second user input representing the additional portion of the search term; and ceasing to highlight the third item, wherein the third item does not represent any items having metadata that at least partially matches the first user input and the second input representing the additional portion of the search term.

2. The method of claim 1, wherein at least one highlighted item has a text label that does not match the first user input.

3. The method of claim 1, further comprising:
responsive to the first user input and concurrently with highlighting the subset of the plurality of items, displaying a pop-up menu comprising a list of at least one item having metadata that at least partially matches the first user input, wherein each item listed in the pop-up menu corresponds to one of the highlighted items.

4. The method of claim 3, further comprising:
receiving user input selecting one of the items from the pop-up menu; and
activating, in response to the user input selecting one of the items from the pop-up menu, a container containing the selected item.

5. The method of claim 1, wherein responsive to the first or second user input matching text associated with a help function, an item representing a help function is highlighted.

6. The method of claim 1, wherein the metadata comprises text.

7. The method of claim 1, wherein each highlighted item represents a container.

8. The method of claim 1, further comprising:
receiving user input selecting one of the plurality of items; and
activating, in response to the user input activating one of the plurality of items, the item corresponding to the selected item.

9. The method of claim 1, wherein highlighting at least the subset of the plurality of items comprises highlighting at least one item representing at least one of:
an application;
an application preference control;
or a preference pane corresponding to the application.

10. The method of claim 1, wherein highlighting at least the subset of the plurality of items comprises:

determining that at least one of the plurality of items matches the first user input and highlighting items representing the matching items using a first type of highlight; and determining that at least one of the plurality of items at least partially matches the first user input and highlighting items representing the partially matching items using a second type of highlight.

11. The method of claim 1, wherein each highlighted item represents at least one directory containing at least one file having metadata that at least partially matches the first user input.

12. A non-transitory machine-readable storage medium including instructions that, when executed on a device, cause the device to:

display a plurality of items in a user interface display;
while maintaining display of the plurality of items:
receive a first user input representing at least a portion of a search term;
in response to receiving the first user input, highlight at least a subset of the plurality of items, the subset of the plurality of items including:
a first item that represents at least a one item having metadata that at least partially matches the first user input;
a second item that represents at least one item having metadata that at least partially matches the first user input; and
a third item that represents at least one item having metadata that, represents at least one item having metadata that at least partially matches the first user input;

while the first item, the second item and the third item are highlighted, receive a second user input representing an additional portion of the search term; and in response to receiving the second user input, incrementally change the display and highlighting of the plurality of items in response to the second user input, including:

maintaining the highlighting of the first item, wherein the first item represents at least one item having metadata that at least partially matches the first user input and the second user input representing the additional portion of the search term;

maintaining the highlighting of the second item, wherein the second item represents at least one item having metadata that at least partially matches the first user input and the second user input representing the additional portion of the search term; and ceasing to highlight the third item, wherein the third item does not represent any items having metadata that at least partially matches the first user input and the second input representing the additional portion of the search term.

13. The non-transitory machine-readable storage medium of claim 12, wherein the instructions that highlight the subset of the plurality of items include instructions that cause the device to highlight at least one item that has a text label that does not match the first user input.

14. The non-transitory machine-readable storage medium of claim 12, wherein the metadata comprises text.

15. The non-transitory machine-readable storage medium of claim 12, further including instructions that, when executed on the device, cause the device to:
display, in response to the first user input and concurrently with highlighting the subset of the plurality of items, a pop-up menu comprising a list of at least one item having metadata that at least partially matches the first user input;

wherein each item listed in the pop-up menu corresponds to one of the highlighted items.

16. The non-transitory machine-readable storage medium of claim 15, further including instructions that, when executed on the device, cause the device to:

receive a third user input selecting one of the items from the pop-up menu; and activate, in response to the user selecting one of the items from the pop-up menu, the corresponding item.

17. The non-transitory machine-readable storage medium of claim 16, further including instructions that, when executed on the device, cause the device to:

momentarily alter, in response to the user selecting one of the items from the pop-up menu, a visual characteristic of the corresponding highlighted item.

18. The non-transitory machine-readable storage medium of claim 17, wherein the momentarily altering a visual characteristic of the item comprises blinking the item.

19. The non-transitory machine-readable storage medium of 16, further including instructions that, when executed on the device, cause the device to:

activate, in response to the user selecting one of the highlighted items, an operating system preference corresponding to the selected item.

20. The non-transitory machine-readable storage medium of claim 12, wherein each item is related to a system function, and further wherein each item comprises at least one preference control related to the system function.

21. A system comprising:

at least one processor; and a computer-readable medium storing one or more sequences of instructions which, when executed by the at least one processor, causes the at least one process to perform operations comprising:

displaying a plurality of items in a user interface display;

while maintaining display of the plurality of items:

receiving a first user input representing at least a portion of a search term;

in response to receiving the first user input, highlighting at least a subset of the plurality of items, the subset of the plurality of items including:

a first item that represents at least a one item having metadata that at least partially matches the first user input;

a second item that represents at least one item having metadata that at least partially matches the first user input; and a third item that represents at least one item having metadata that represents at least one item having metadata that at least partially matches the first user input;

while the first item, the second item and the third item are highlighted, receiving a second user input representing an additional portion of the search term; and in response to receiving the second user input, incrementally changing the displaying and highlighting of the plurality of items in response to the second user input, including:

maintaining the highlighting of the first item, wherein the first item represents at least one item having metadata that at least partially matches the first user input and the second user input representing the additional portion of the search term;

maintaining the highlighting of the second item, wherein the second item represents at least one item having metadata that at least partially matches the first user input and the second user input representing the additional portion of the search term; and ceasing to highlight the third item, wherein the third item does not represent any items having metadata that at least partially matches the first user input and the second input representing the additional portion of the search term.

* * * * *